(12) United States Patent
Sylthe et al.

(10) Patent No.: US 7,640,311 B2
(45) Date of Patent: Dec. 29, 2009

(54) METHOD FOR VIEWING NON-IMAGE ATTACHMENTS ON A PORTABLE ELECTRONIC DEVICE

(75) Inventors: Olav A. Sylthe, Atlanta, GA (US); Dan Dumitru, Atlanta, GA (US); Eshwar Stalin, Atlanta, GA (US); Andrew Bocking, Waterloo (CA)

(73) Assignee: Research In Motion Limited, Ontario (CA)

( * ) Notice: Subject to any disclaimer, the term of this patent is extended or adjusted under 35 U.S.C. 154(b) by 425 days.

(21) Appl. No.: 11/395,798

(22) Filed: Mar. 31, 2006

(65) Prior Publication Data

US 2007/0233792 A1    Oct. 4, 2007

(51) Int. Cl.
  *G06F 15/16* (2006.01)
  *G06F 3/00* (2006.01)
(52) U.S. Cl. ........................... 709/206; 715/746
(58) Field of Classification Search ................... 709/206
  See application file for complete search history.

(56) References Cited

U.S. PATENT DOCUMENTS

| | | | |
|---|---|---|---|
| 6,360,252 B1 * | 3/2002 | Rudy et al. ................. | 709/206 |
| 2001/0051007 A1 | 12/2001 | Teshima | |
| 2002/0016818 A1 | 2/2002 | Kirani et al. | |
| 2002/0062396 A1 | 5/2002 | Kakei et al. | |
| 2004/0073873 A1 | 4/2004 | Croney et al. | |
| 2004/0183817 A1 | 9/2004 | Kaasila | |
| 2005/0232581 A1 | 10/2005 | Karasawa | |
| 2006/0055693 A1 | 3/2006 | Sylthe et al. | |
| 2006/0056604 A1 | 3/2006 | Sylthe et al. | |
| 2006/0225001 A1 | 10/2006 | Sylthe et al. | |
| 2008/0028335 A1 | 1/2008 | Rohrabaugh et al. | |
| 2008/0102887 A1 | 5/2008 | Sylthe et al. | |

OTHER PUBLICATIONS

Research in Motion; "Attachment Service"; Oct. 1, 2004; http://web.archive.org/web/20040807081104/www.blackberry.com/knowledgecenterpublic/livelink.exe/fetch/2000/7979/278390/Attachment_Service.pdf?nodeid=322231&vernum=0.*

* cited by examiner

*Primary Examiner*—Ario Etienne
*Assistant Examiner*—Blake Rubin
(74) *Attorney, Agent, or Firm*—Stephen A. Bucchianeri, Esq.; Brij K. Agarwal, Esq.; Eckert Seamans Cherin & Mellott, LLC

(57) ABSTRACT

A method for viewing an attachment of an email message on a portable electronic device in which the attachment has a renderable format is provided. The method includes: requesting to view the attachment in an attachment viewer of the portable electronic device, building a graph structure within an attachment server representing a map of the attachment, the graph structure including at least one renderable identifier corresponding to a page of the attachment, requesting rendering of the attachment, the rendering request being send from the attachment viewer to the attachment server and including the at least one renderable identifier, initializing a rendering library and storing rendering commands corresponding to command types of the graph structure in the rendering library, drawing the rendering commands in an off-screen bitmap, saving the off-screen bitmap as a JPEG file, sending the JPEG file to the portable electronic device and displaying the JPEG file in the attachment viewer.

12 Claims, 10 Drawing Sheets

METHOD FOR VIEWING NON-IMAGE ATTACHMENTS ON A PORTABLE ELECTRONIC DEVICE

FIELD

The present embodiment relates to a method for viewing attachments on a portable electronic device, in particular, attachments having non-image formats.

BACKGROUND

Wireless technology has made it possible for email messages to be received and displayed by various portable electronic devices including Personal Digital Assistants (PDAs), for example. Sending email messages including attachments, such as photographs or scanned documents, is becoming increasingly popular, however, most attachments are formatted for a rich desktop or printer experience and generally require a desktop PC with a large screen display for proper viewing. As such, viewing these attachments on the small screens of most portable electronic devices presents a challenge.

In addition, attachments are often created using proprietary formats such as Microsoft Office™ or Adobe Acrobat™, for example. In order to accommodate these and other proprietary formats, some portable electronic devices now include client versions of the original document creation applications, such as Pocket Word™ and Pocket Excel™, for example. These mobile versions of original applications tax device resources including memory and storage space and therefore do not provide an ideal solution.

BRIEF DESCRIPTION OF THE DRAWINGS

The embodiment will be better understood with reference to the following Figures in which like numerals denote like parts and in which.

DETAILED DESCRIPTION

Figure 1:
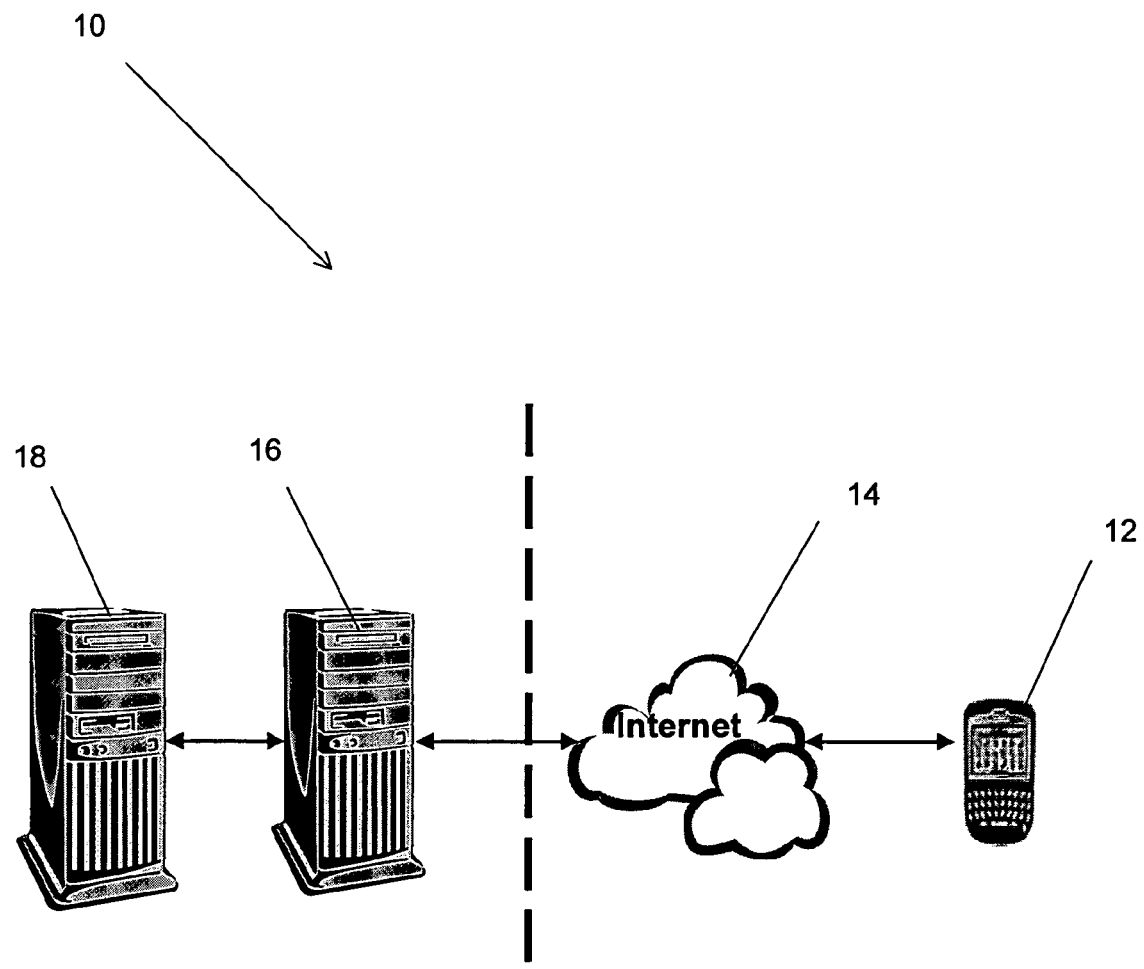
FIG. 1 is a schematic diagram of a wireless communication system.

Referring to FIG. 1, a communication system 10 for a portable electronic device 12 is generally shown. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN Mobitex, DataTAC networks, EDGE or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as an attachment server, which communicates with an email client and an attachment viewer of the portable electronic device 12 to allow a user to view attachments that are received in email messages. While only one server 18 is shown for illustration purposes, a person skilled in the art will understand that the attachment server may alternatively be a separate server.

Figure 2:
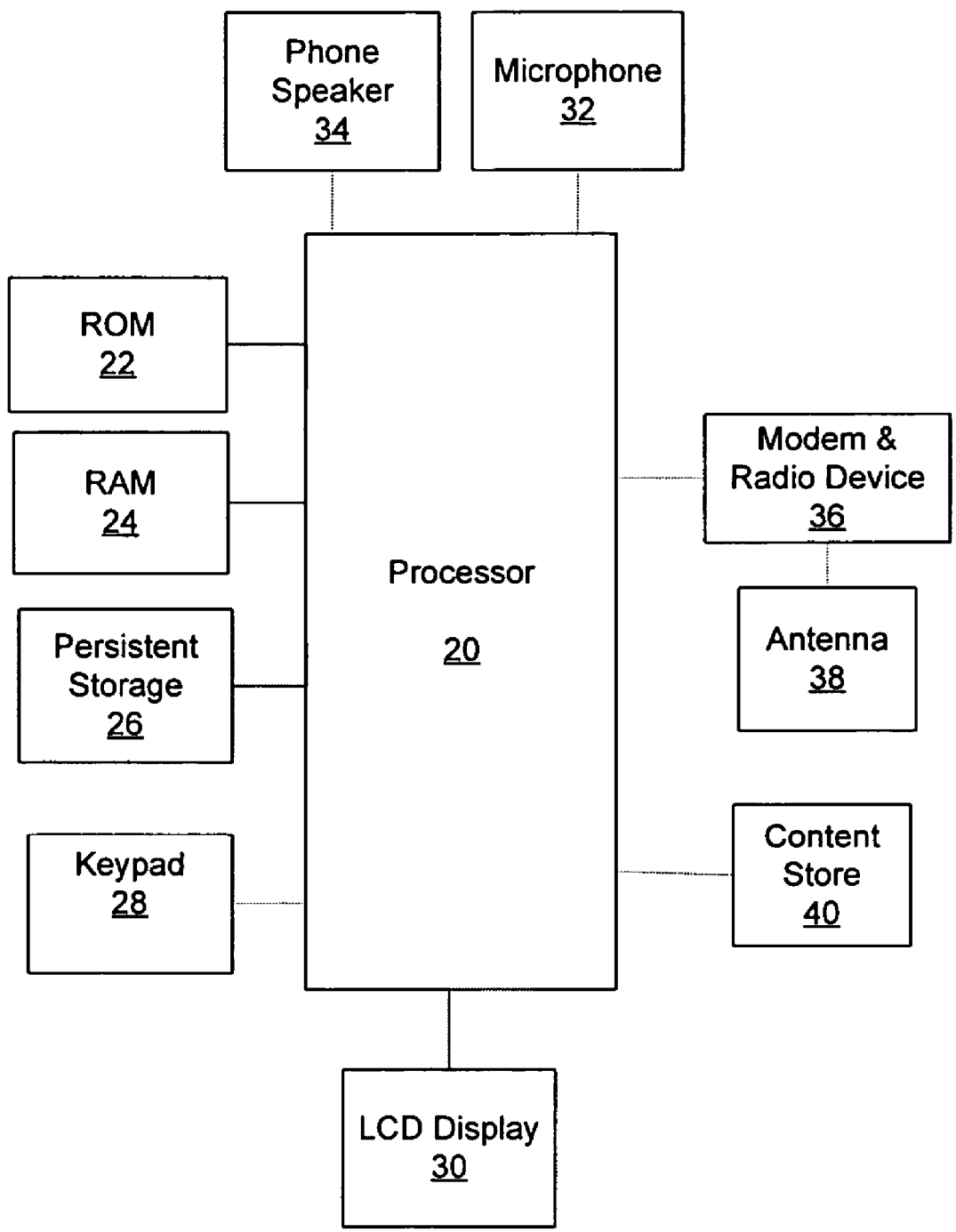
FIG. 2 is a block diagram of components of a portable electronic device according to an embodiment.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

The portable electronic device 12 is based on a microcomputer including a processor 20 connected to a read-only-memory (ROM) 22 that contains a plurality of applications executable by the processor 20 that enables each portable electronic device 12 to perform certain functions including, for example, PIN message functions, SMS message functions and cellular telephone functions. The processor 20 is also connected to a random access memory unit (RAM) 24 and a persistent storage device 26 which are responsible for various non-volatile storage functions of the portable electronic device 12. The processor 20 receives input from various input devices including a keypad 28. The processor 20 outputs to various output devices including an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38. A content store 40, which is generally a file storage system for the portable electronic device 12, is also provided.

Figure 3:
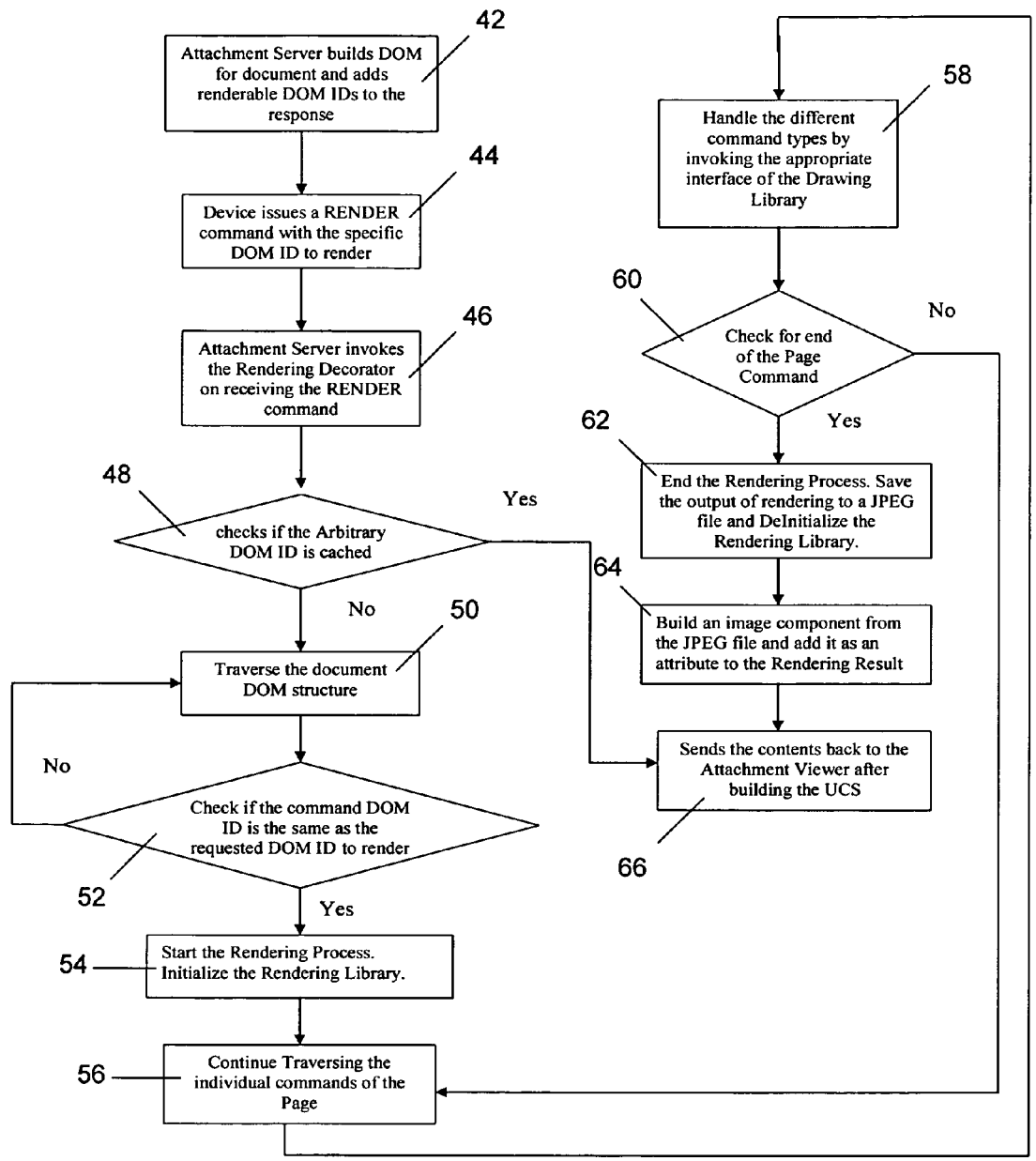
FIG. 3 is a flowchart showing server-side operation of a method for requesting and displaying a rendered attachment on the portable electronic device of FIG. 2.

Referring to FIG. 3, server-side operation for a method for requesting and displaying a rendered attachment on portable electronic device 12 is shown. Rendering generally refers to a process for providing an image that resembles a screenshot of an attachment as it would appear when opened in the application in which it was created. Types of renderable formats include: Microsoft Office™ formats including PowerPoint™, Word™ and Excel™, as well as other formats, such as WordPerfect™, Adobe Acrobat™ and Corel™, for example. Any supported document format is renderable to allow original fonts, layouts, embedded graphics, tables and styles to appear as they would in the original application.

When the attachment server receives a request from the attachment viewer of the portable electronic device 12 to view an attachment that was received with an email message, the attachment server first builds a Document Object Model (DOM) by parsing the attachment document (step 42). In this manner, a graph structure is built within the server representing a map of the original image. The DOM contains textual content, font, style and formatting attributes as well as layout attributes, such as page/slide size, positioning information (i.e. x, y and z coordinates on the page/slide), embedded graphics and tables, for example. DOM structure is disclosed in United States Patent Application No. 2006/0055693, which is herein incorporated by reference. The attachment server further creates a server descriptor, which is generally an initial response from the attachment server and includes a list of renderable DOM identifiers. The renderable DOM identifiers are unique identifiers that represent each page in a renderable document attachment. After building the DOM, the attachment server sends the response including the renderable DOM identifiers to the portable electronic device 12.

Upon receiving the response from the attachment server, the attachment viewer issues a "render" command including the particular DOM id to render, as indicated at step 44. The attachment server then invokes a Rendering Decorator, which is a component of the attachment server that executes the rendering logic, to process the command (step 46). At step 48, the rendering decorator first checks in-memory document DOM cache of the attachment server to determine if the arbitrary DOM id has already been rendered. If the DOM id has already been rendered, the attachment server returns the rendered attachment to the attachment viewer, in a manner that will be described further below, as indicated at step 66.

If the DOM id has not been previously rendered, the Rendering Decorator traverses the attachment document DOM structure (step 50) and checks each command DOM id against the requested DOM id to render (step 52). When the matching DOM id is found, the rendering process is started and a rendering library is initialized, as indicated at step 54. At steps 56 and 58, individual commands of the page are traversed and appropriate rendering commands are issued to the rendering library based on the command type. Command types include: vector, image, paragraph and text segment, for example. The rendering library draws all of the rendering requests on a Handle to Device Context (HDC) associated bitmap. The HDC associated bitmap is also referred to as an off-screen bitmap because it is created in memory by the attachment server.

Once all of the commands of the page are rendered, which is checked at step 60, the contents of the rendering library are saved to a JPEG file and the rendering library is de-initialized, as indicated at step 62. An image component is then built from the JPEG file and is added as an attribute to the Rendering Decorator result, at step 64. At step 66, the JPEG file of the rendered attachment is encapsulated in Universal Content Stream (UCS) format and sent to the attachment viewer of the portable electronic device 12 where the UCS data is saved in the content store 40 and the JPEG is then shown on the display 30.

Figure 4:
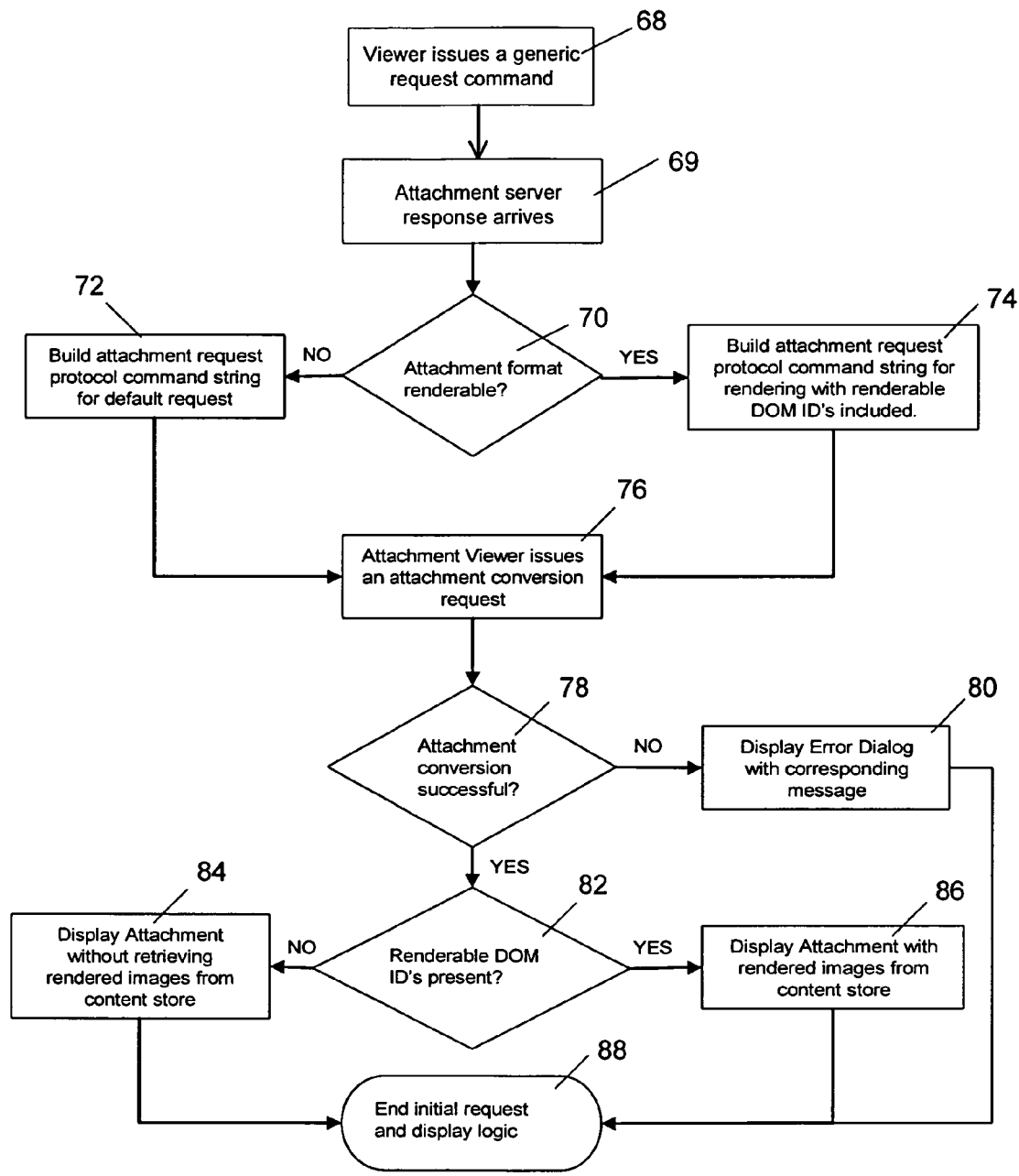
FIG. 4 is a flowchart showing device-side operation of a method for requesting and displaying a rendered attachment on the portable electronic device of FIG. 2.

Referring now to FIG. 4, device-side operation for the method for requesting and displaying a rendered attachment on portable electronic device 12 of FIG. 3 is shown. At step 68, the user makes a request to view an attachment of an email message. Upon receiving the request, the attachment server builds the DOM and sends the server descriptor with the renderable DOM identifiers to the portable electronic device 12, at step 69, and as previously described in step 42 of FIG. 3. The attachment viewer then checks the server descriptor and if a renderable DOM id list is found, the attachment viewer persists the list to the content store 40.

The attachment viewer then determines whether or not the attachment format is renderable at step 70. For text attachments, rendering is not supported. For non-renderable formats, the attachment viewer builds an attachment request protocol command string for a default request, as indicated at step 72. If the attachment format is renderable, the attachment viewer builds an attachment request protocol command string for rendering with renderable DOM identifiers included, as indicated at step 74. At step 76, the attachment viewer issues the Extensible Markup Language (XML) conversion request that was constructed in step 72 or step 74.

At step 78, the attachment viewer determines if the attachment conversion was successful. If unsuccessful, an error message based upon returned error code from the attachment server is displayed on the display 30 of the portable electronic device 12 and the logic is terminated, as indicated at steps 80 and 88, respectively.

If the conversion is successful, the attachment viewer parses the UCS data that was returned from the attachment server to search for renderable DOM identifiers, at step 82. If no renderable DOM identifiers are present, the converted attachment is displayed in the attachment viewer on the display 30 of the portable electronic device 12 without rendered images, as indicated at step 84. If renderable DOM identifiers are present, the attachment viewer displays the attachment with a rendered image, which is retrieved from the content store 40, for each requested page/slide shown in-line with textual content of the attachment, as indicated at step 86. In both steps 84 and 86, once all of the requested UCS data has been displayed, the logic is terminated at step 88.

Figure 5A:
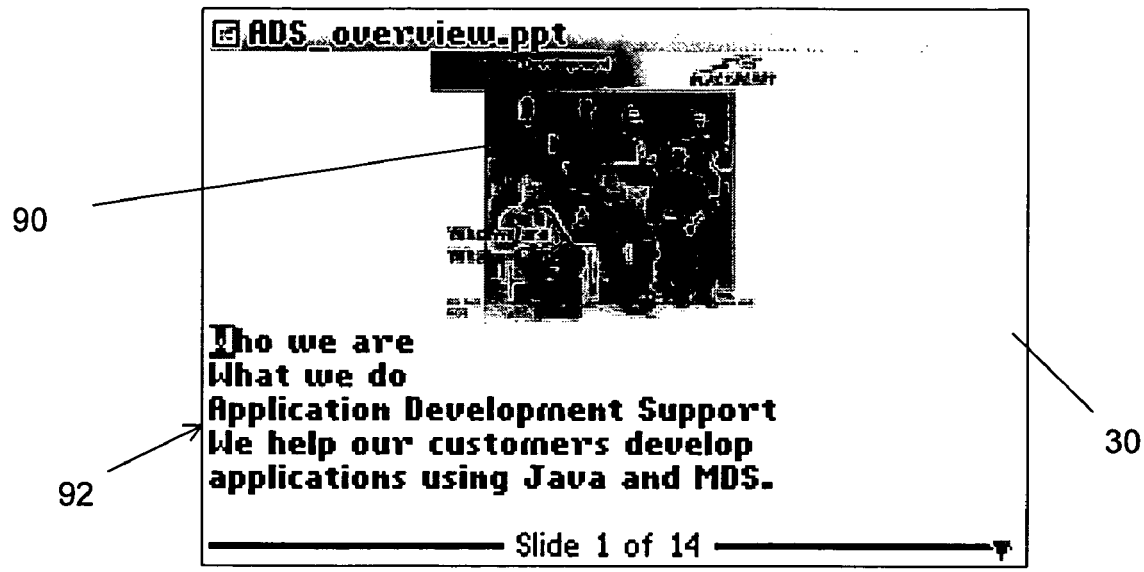
FIGS. 5a to 10b are screen shots of a display of the portable electronic device of FIG. 2.
Figure 5B:
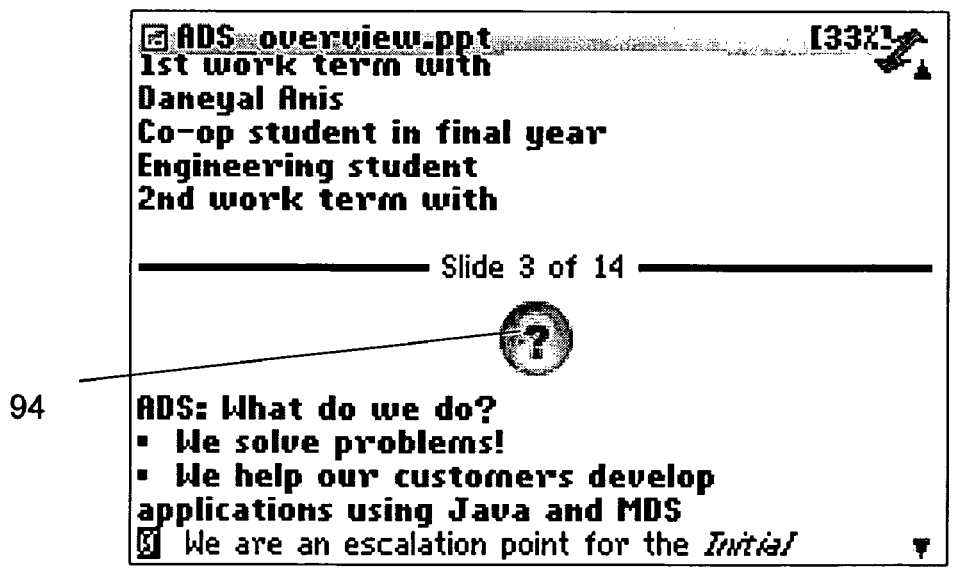

Operation of the present embodiment is described with reference to FIGS. 5a to 10b in which an example PPT attachment is shown including rendered images. When the example PPT attachment is opened for the first time, it appears with both text 92 and a thumbnail 90 of the slide, as shown in FIG. 5a. Thumbnails that have not yet been retrieved from the attachment server are shown as question mark icons 94, as shown in FIG. 5b. Requests for pending thumbnails are issued automatically as a user navigates through the document, however, the speed at which the thumbnails are retrieved is determined by server load, attachment complexity and bandwidth constraint.

Figure 6A:
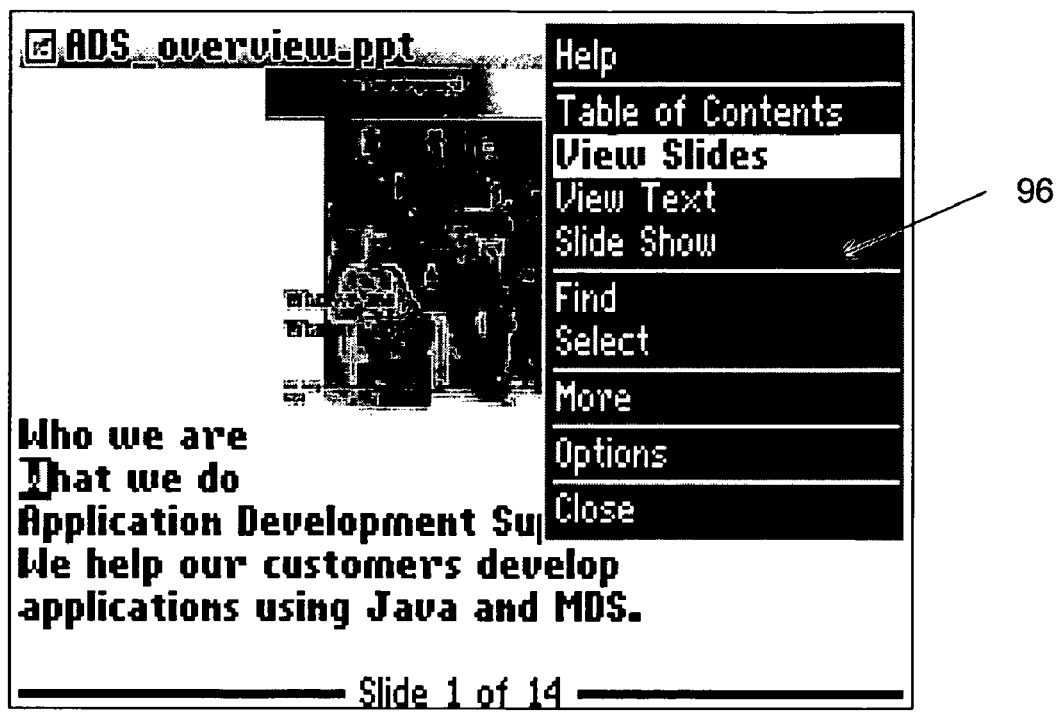
Figure 6B:
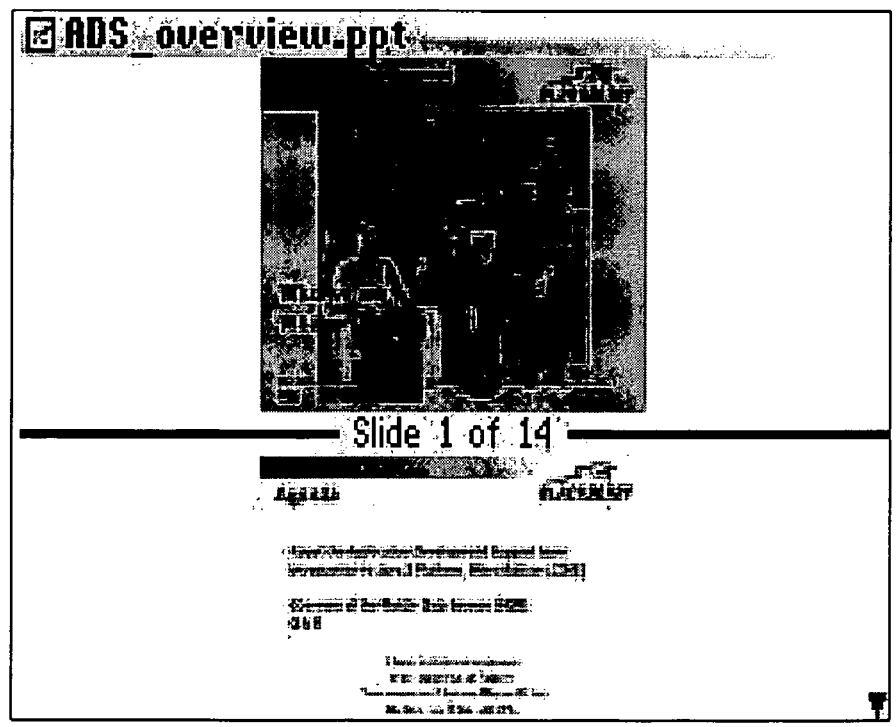
Figures 7A, 7B:
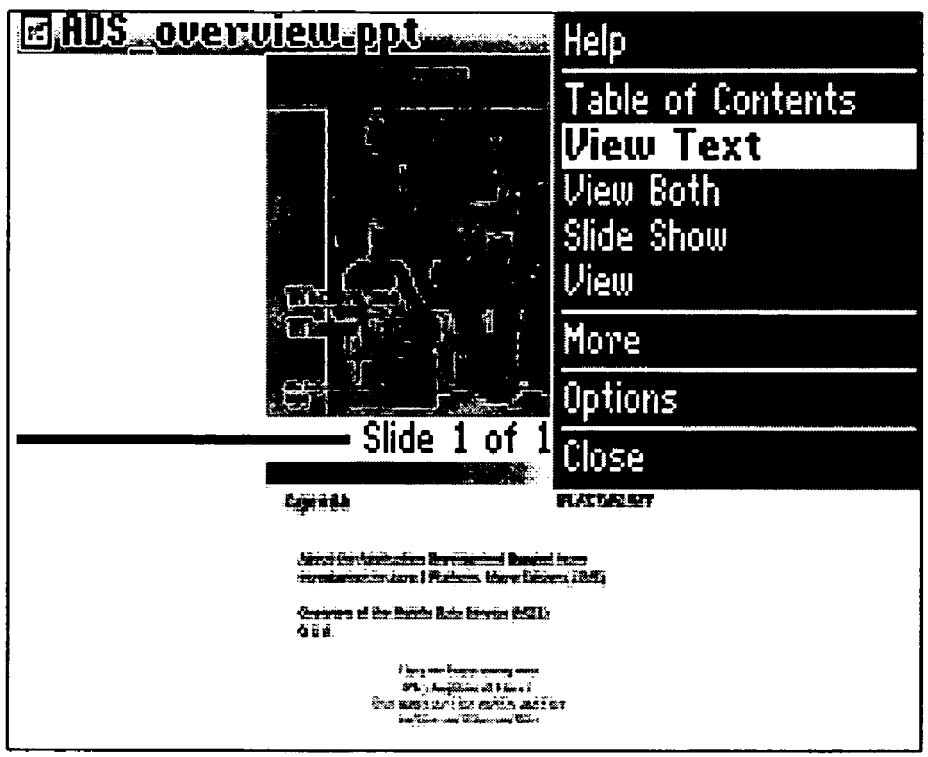
Figure 8A:
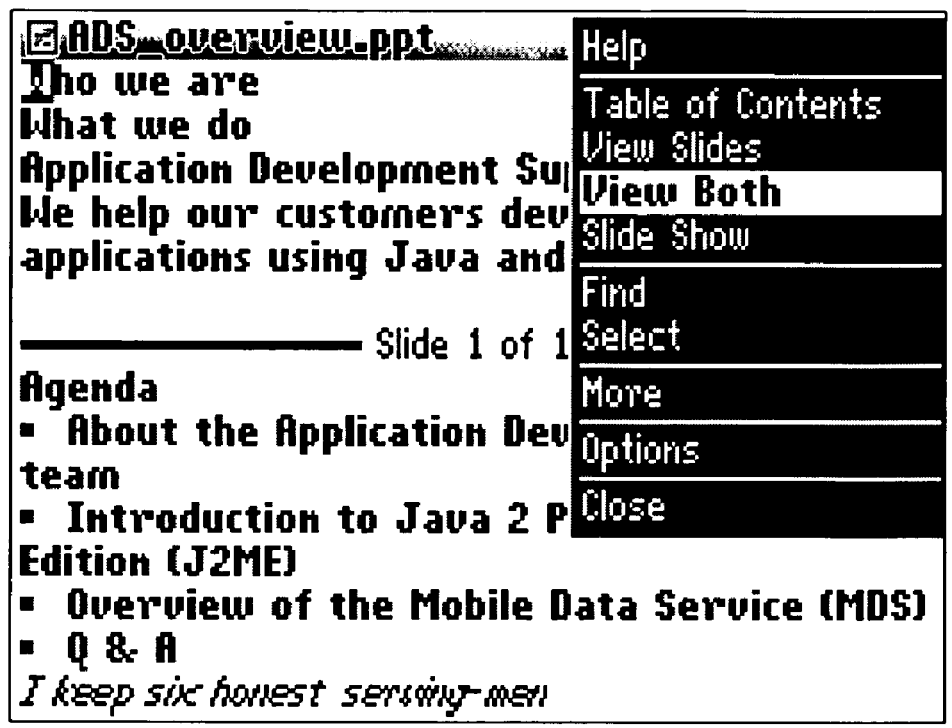
Figure 8B:

Three different views are available for the PPT attachments. In addition to the default "View Both" option, which is shown in FIGS. 5a and 5b, a "View Slides" option and a "View Text" option are also available. When the "View Slides" view is selected from attachment viewer pull down menu 96 of FIG. 6a, the text is hidden and only thumbnails 90 are displayed, as shown in FIG. 6b. When the "View Text" view is selected from the pull down menu 96, which is shown in FIG. 7a, the thumbnails are hidden and only text is displayed, as shown in FIG. 7b. Referring to FIG. 8a, the "View Both" view may be selected from the menu 96, while in the "View Text" view and the display 30 will revert to showing thumbnails 90 and text 92, as shown in FIG. 8b and FIG. 6a.

Figure 9A:
Figure 9B:
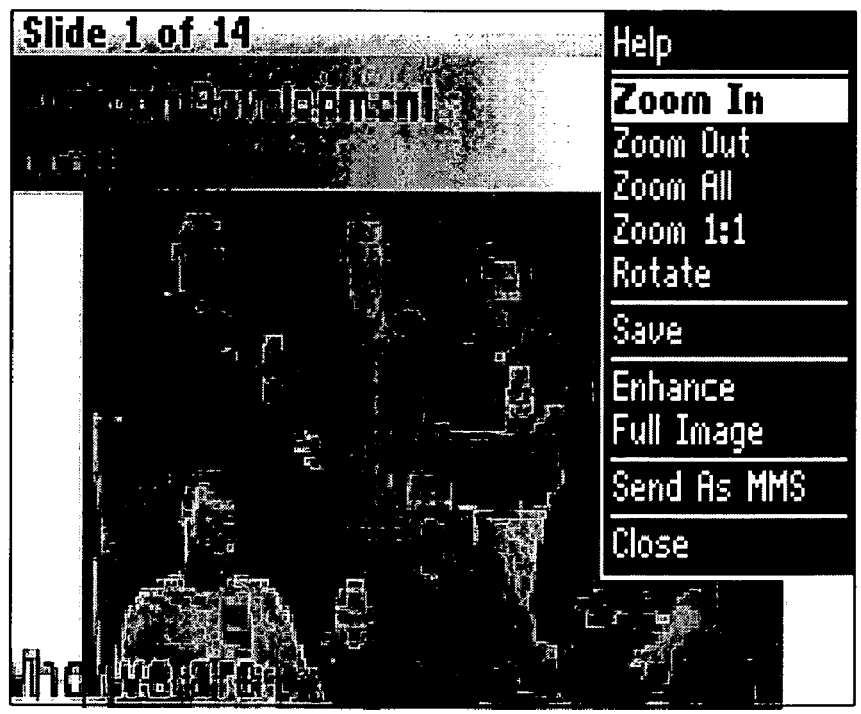

In the "View Both" and the "View Slides" views, the slide thumbnails 90 are highlighted when selected using a track wheel of the portable electronic device 12. When a the thumbnail is selected, the user may invoke the "View" command, as shown in FIG. 9a, to view the full slide in Image View Screen, which is shown in FIG. 9b. While in Image View, any available image commands may be performed on the slide including: zoom, pan, rotate, enhance, full image and save, for example. A detailed description of the commands available in "Image View" is provided in Attachment Service 4.0 Feature Specification, which is herein incorporated by reference.

Figure 10A:
Figure 10B:
Figure 5B:
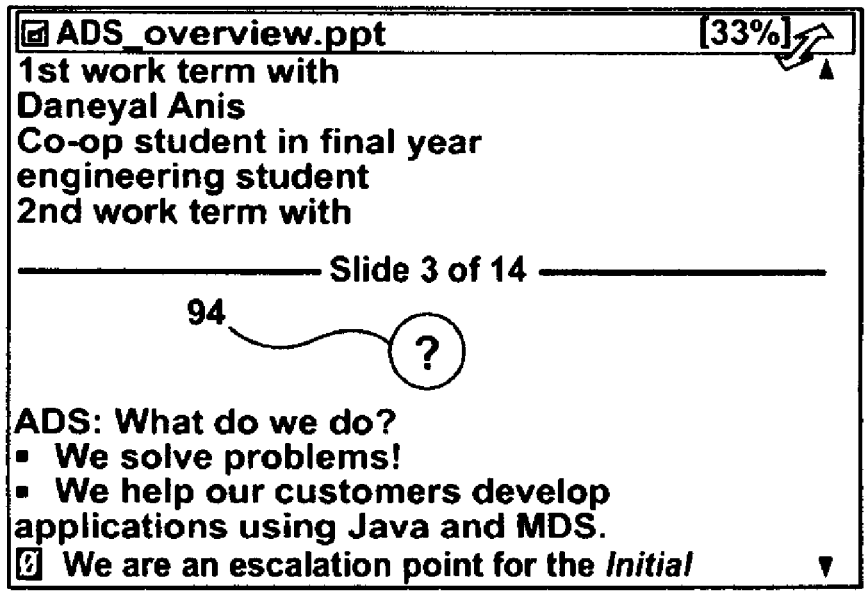
Figure 6A:
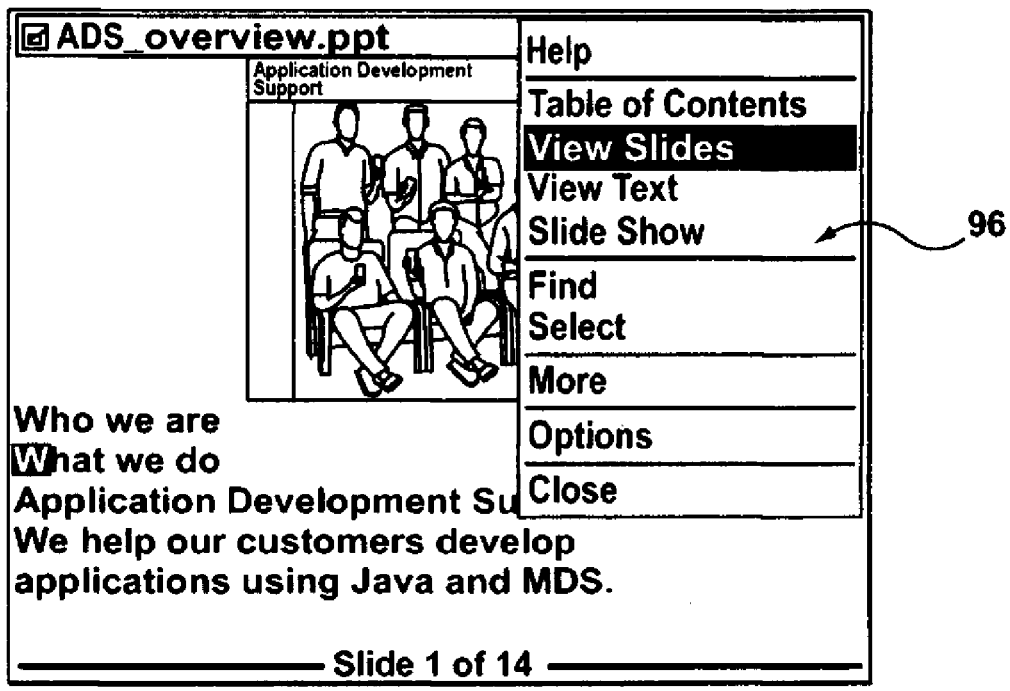
Figure 6B:
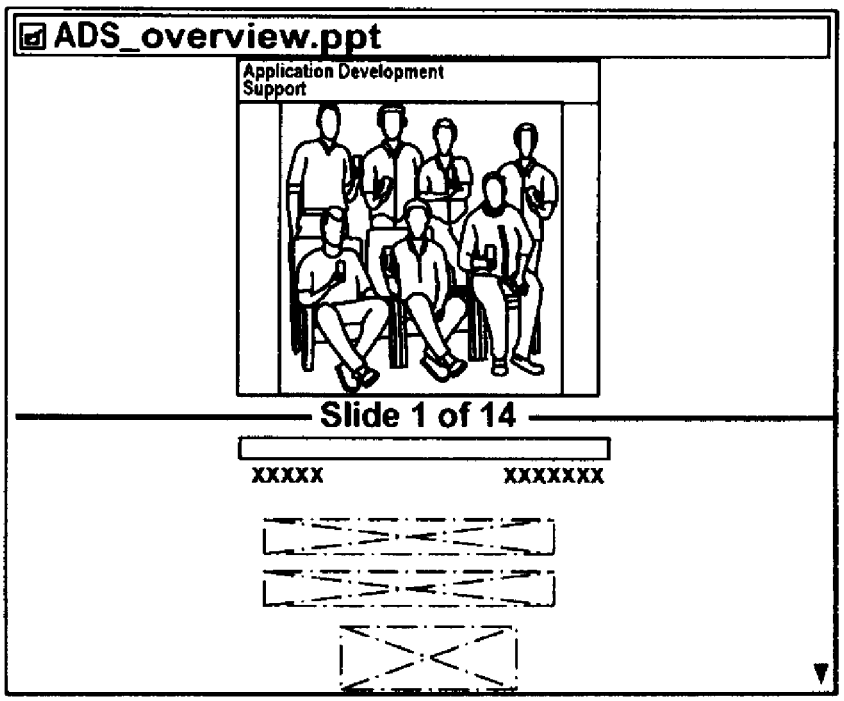
Figure 7A:
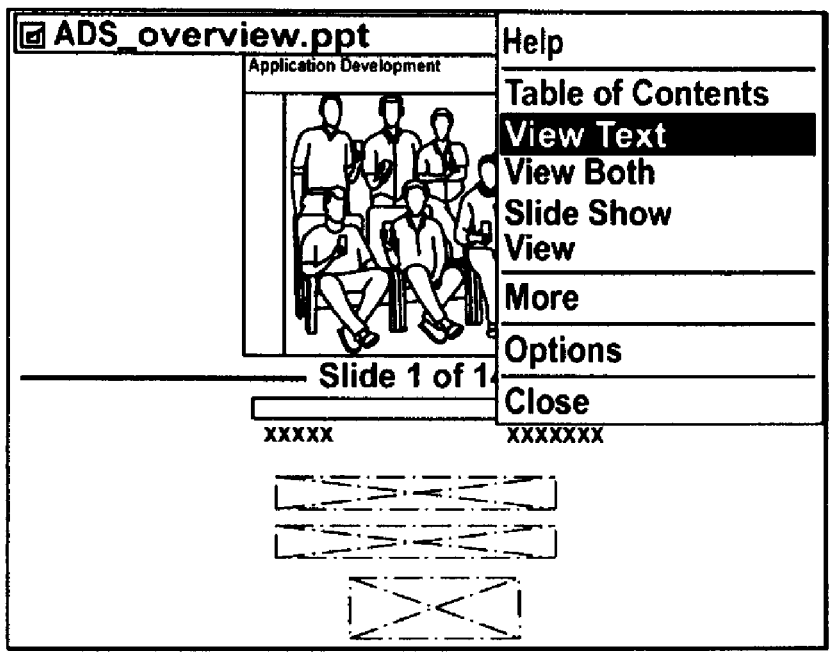
Figure 7B:
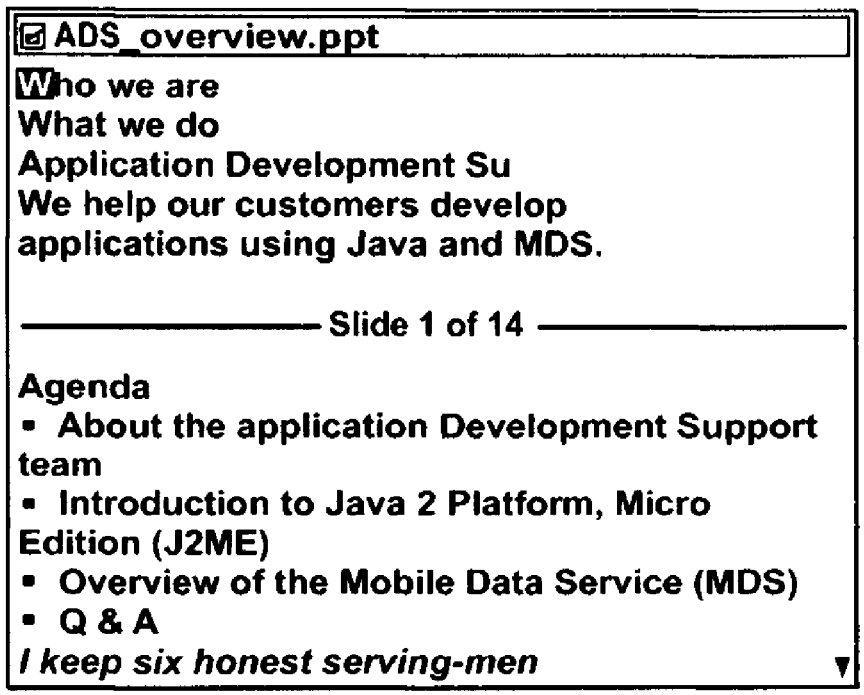
Figure 8A:
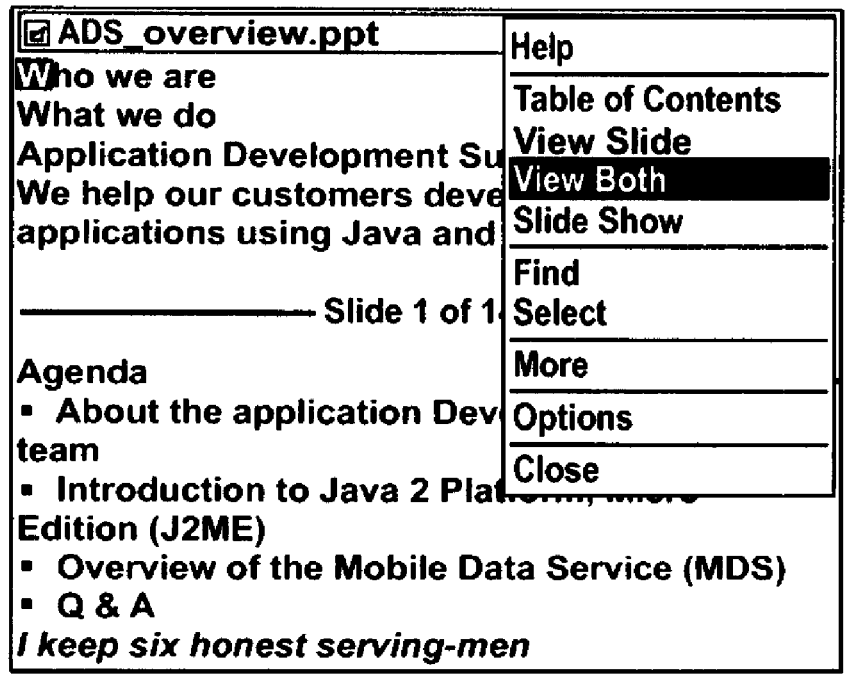
Figure 8B:
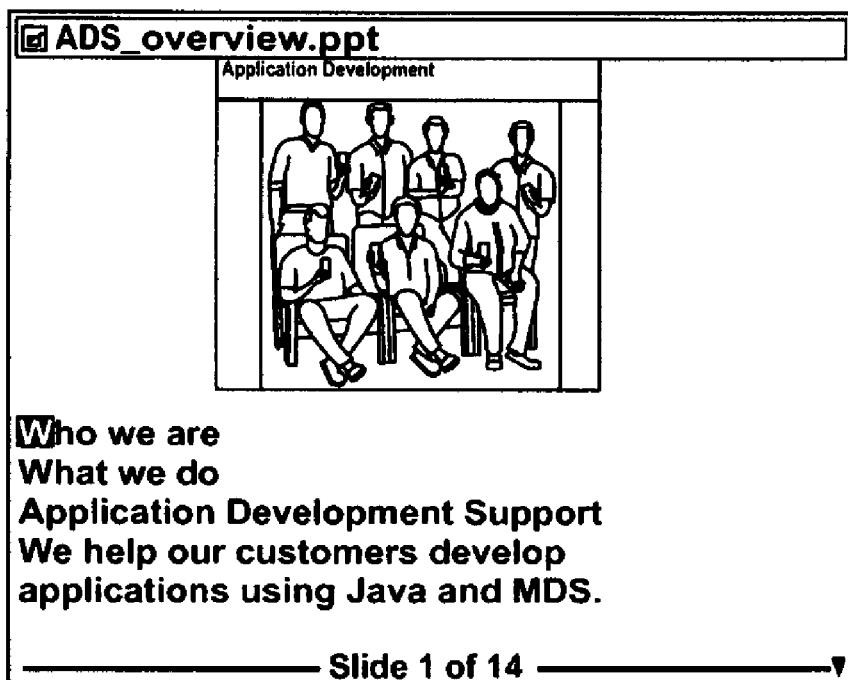
Figure 9A:
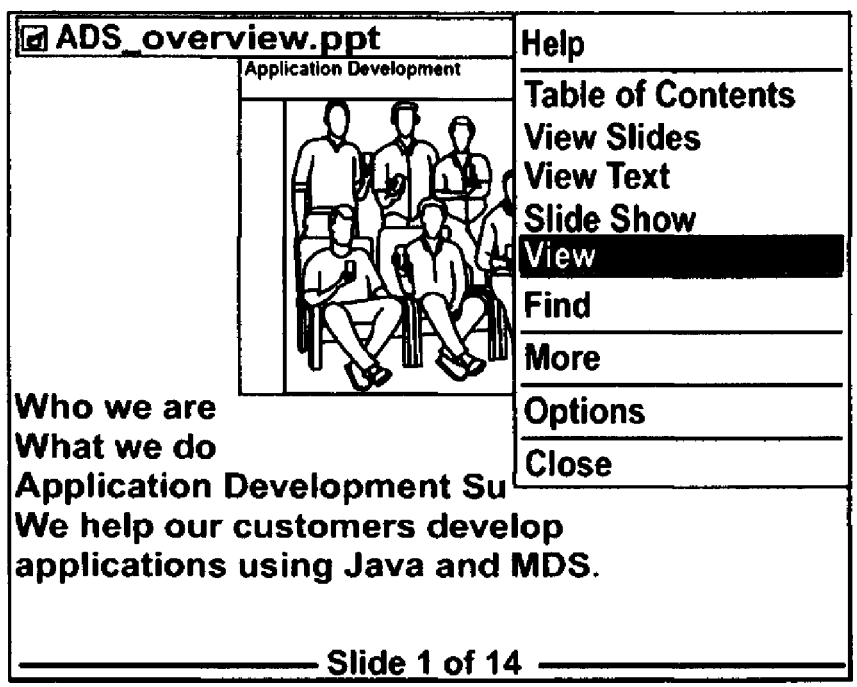
Figure 9B:
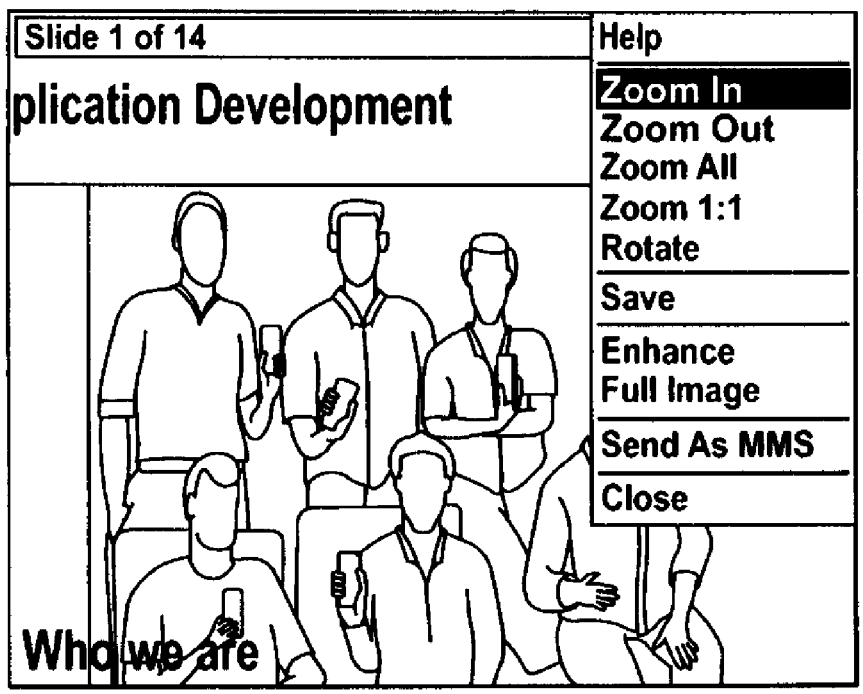
Figure 10A:
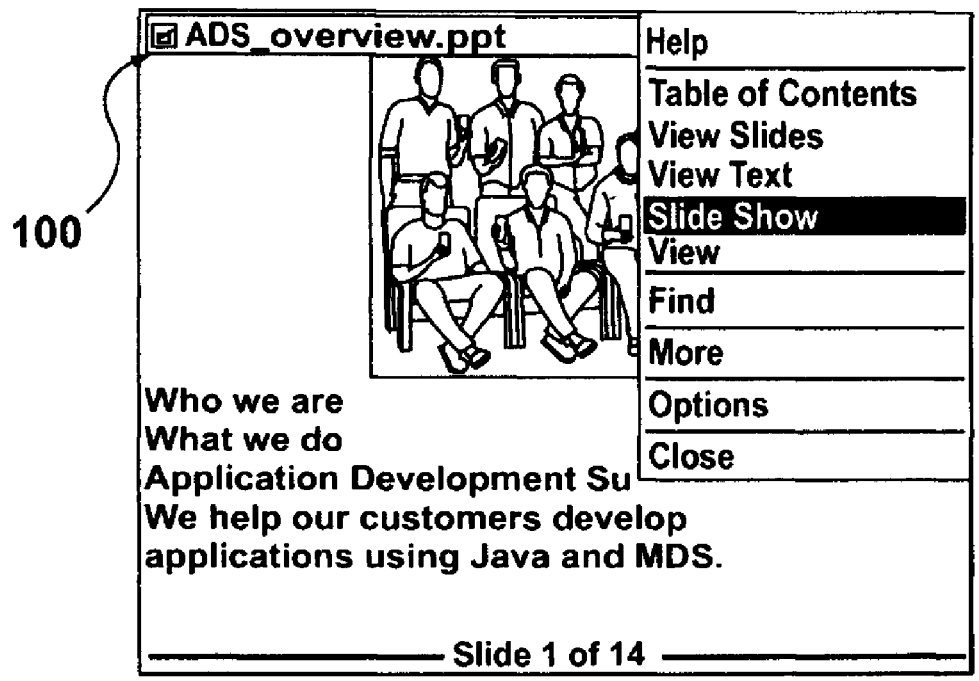
Figure 10B:
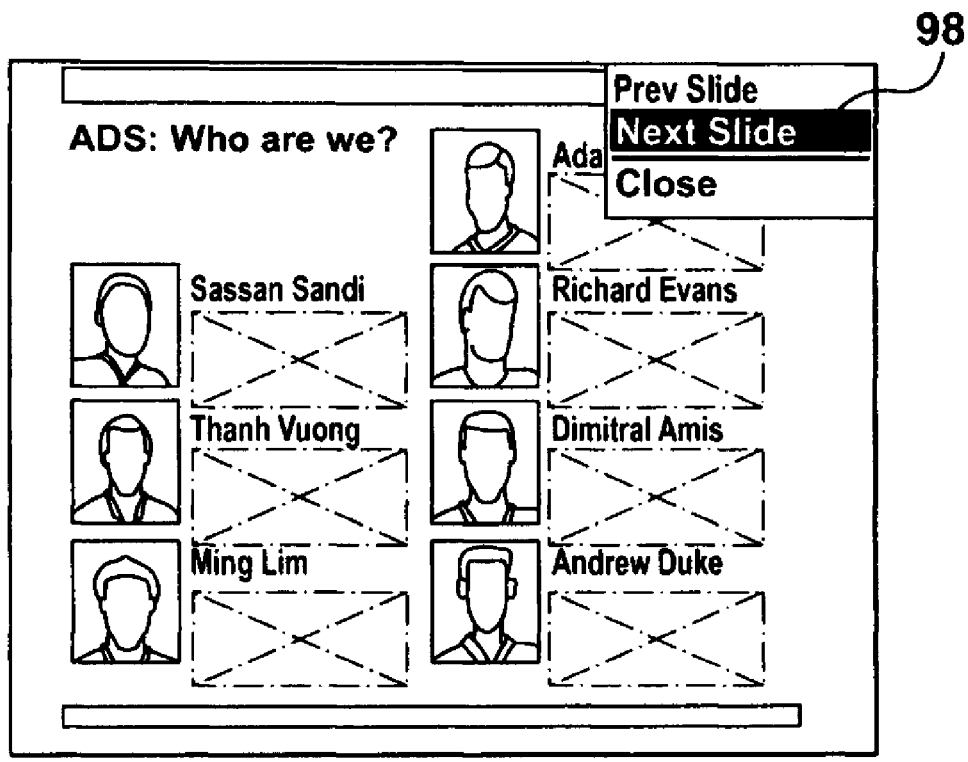

A "Slide Show" command is also provided on pull down menu 96 and may be selected as shown in FIG. 10a. The "Slide Show" command starts a slideshow mode in which individual slide images are displayed in full screen mode (i.e. title bar 100, which appears in FIGS. 5a to 10a, is hidden) so that the slide images fill the screen as much as permitted by the slide aspect ratio. "Slide Show" mode is shown in FIG. 10b. In order to advance to the next slide, a space bar or return key may be depressed. It is also possible to navigate between slides by using "Prev Slide" and "Next Slide" options, which are provided in "Slide Show" pull down menu 98, or pressing dedicated keys on the keypad 28. Upon reaching the end of the currently retrieved slides in "Slide Show" mode, the view reverts to the previously selected view when the space or enter key is depressed. Pressing "Esc" on the keypad 28 aborts the "Slide Show" mode. A keyboard shortcut for "Slide Show" mode is also provided.

A specific embodiment has been shown and described herein. However, modifications and variations may occur to those skilled in the art. For example, although the portable electronic device 12 has been described having cellular telephone capabilities, the described embodiment is not limited to portable electronic devices having both cellular telephone and email capabilities. A portable electronic device having email capabilities but not cellular telephone capabilities may also be used. All such modifications and variations are believed to be within the sphere and scope of the present embodiment.

What is claimed is:

1. A method for viewing an attachment of an email message on a portable electronic device comprising:
   requesting to view said attachment in an attachment viewer of said portable electronic device, said attachment having a renderable format;
   building a graph structure within an attachment server representing a map of said attachment, said graph structure including at least one renderable identifier corresponding to a page of said attachment;
   requesting rendering of said attachment, said rendering request being sent from said attachment viewer to said attachment server and including said at least one renderable identifier;
   initializing a rendering library and storing rendering commands corresponding to command types of said graph structure in said rendering library;
   drawing said rendering commands in an off-screen bitmap;
   saving said off-screen bitmap as a JPEG file;
   sending said JPEG file to said portable electronic device; and
   displaying said JPEG file in said attachment viewer.

2. A method as claimed in claim 1, further comprising encapsulating said JPEG file in Universal Content Stream (UCS) data prior to sending said JPEG file to said portable electronic device.

3. A method as claimed in claim 2, further comprising saving said UCS data in a content store of said portable electronic device.

4. A method as claimed in claim 1, wherein said graph structure is a Document Object Model (DOM).

5. A server process comprising:
   receiving a request to view an attachment of an email message, said attachment having a renderable format;
   building a graph structure within an attachment server representing a map of said attachment, said graph structure including at least one renderable identifier corresponding to a page of said attachment;
   receiving a request to render said attachment, said request to render including said at least one renderable identifier;
   initializing a rendering library and storing rendering commands corresponding to command types of said graph structure in said rendering library;
   drawing said rendering commands in an off-screen bitmap;
   saving said off-screen bitmap as a JPEG file; and
   transmitting said JPEG file.

6. A server method as claimed in claim 5, further comprising encapsulating said JPEG file in Universal Content Stream (UCS) data prior to transmitting said JPEG file.

7. A server method as claimed in claim 5, wherein said graph structure is a Document Object Model (DOM).

8. A mobile device method comprising:
   transmitting a request to view an attachment of an email message, said attachment having a renderable format;
   receiving a server descriptor including at least one renderable identifier corresponding to a page of said attachment;
   transmitting a request to render said attachment, said request to render including said at least one renderable identifier;
   receiving a JPEG file corresponding to said attachment rendered to an off-screen bitmap; and
   displaying said JPEG file.

9. The mobile device method as claimed in claim 8, wherein said request to render said attachment is built as an attachment request protocol command string for rendering said at least one renderable identifier.

10. The mobile device method as claimed in claim 9, wherein said attachment request protocol command string is expressed in Extensible Markup Language (XML).

11. The mobile device method as claimed in claim 8, wherein said JPEG file is displayed in-line with any textual content of said attachment.

12. The mobile device method as claimed in claim 8, further comprising saving said JPEG file in a content store.

* * * * *

UNITED STATES PATENT AND TRADEMARK OFFICE
CERTIFICATE OF CORRECTION

PATENT NO. : 7,640,311 B2  Page 1 of 1
APPLICATION NO. : 11/395798
DATED : December 29, 2009
INVENTOR(S) : Sylthe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,640,311 B2 | Page 1 of 1 |
| APPLICATION NO. | : 11/395798 | |
| DATED | : December 29, 2009 | |
| INVENTOR(S) | : Olav A. Sylthe et al. | |

It is certified that error appears in the above-identified patent and that said Letters Patent is hereby corrected as shown below:

Title page,
Item (57), Abstract, line 9, "send" should read -- sent --.

Specification,
Column 4, line 49, "When a the" should read -- When the --.

Signed and Sealed this
Twenty-third Day of August, 2011

David J. Kappos
*Director of the United States Patent and Trademark Office*

UNITED STATES PATENT AND TRADEMARK OFFICE
CERTIFICATE OF CORRECTION

PATENT NO. : 7,640,311 B2  
APPLICATION NO. : 11/395798  
DATED : December 29, 2009  
INVENTOR(S) : Olav A. Sylthe et al.

Page 1 of 7

It is certified that error appears in the above-identified patent and that said Letters Patent is hereby corrected as shown below:

In the Drawings

Figure 5a is cancelled and replaced by the attached Figure 5a below.

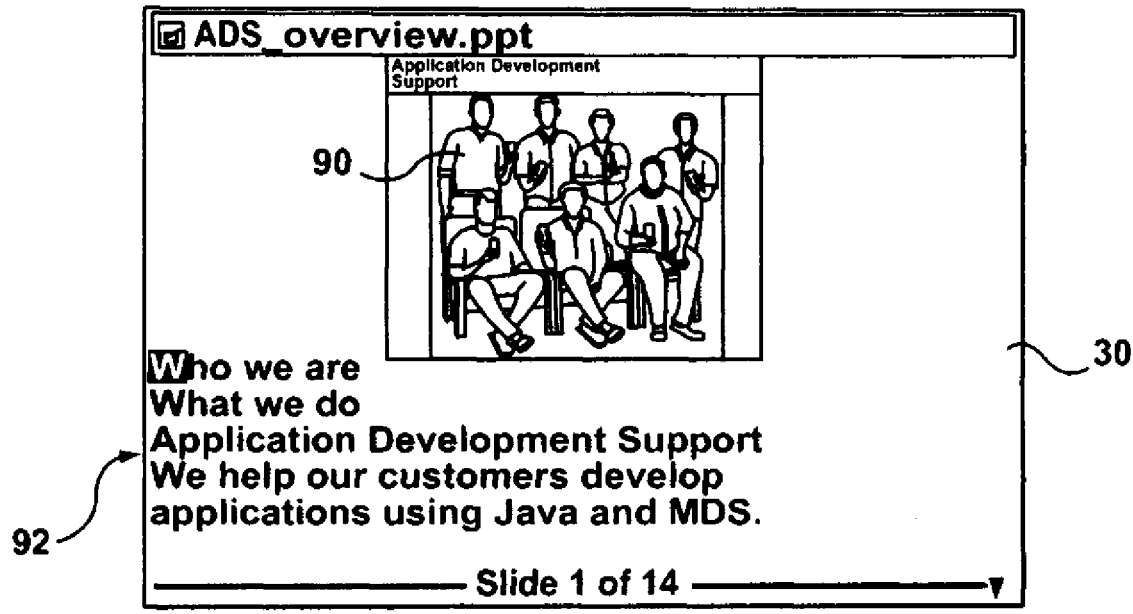

FIG. 5a

Signed and Sealed this  
Eighteenth Day of February, 2014

Michelle K. Lee  
*Deputy Director of the United States Patent and Trademark Office*

Figure 5b is cancelled and replaced by the attached Figure 5b below.

Figure 6a is cancelled and replaced by the attached Figure 6a below.

Figure 6b is cancelled and replaced by the attached Figure 6b below.

Figure 7a is cancelled and replaced by the attached Figure 7a below.

Figure 7b is cancelled and replaced by the attached Figure 7b below.

Figure 8a is cancelled and replaced by the attached Figure 8a below.

Figure 8b is cancelled and replaced by the attached Figure 8b below.

Figure 9a is cancelled and replaced by the attached Figure 9a below.

Figure 9b is cancelled and replaced by the attached Figure 9b below.

Figure 10a is cancelled and replaced by the attached Figure 10a below.

Figure 10b is cancelled and replaced by the attached Figure 10b below.